Patented June 13, 1933

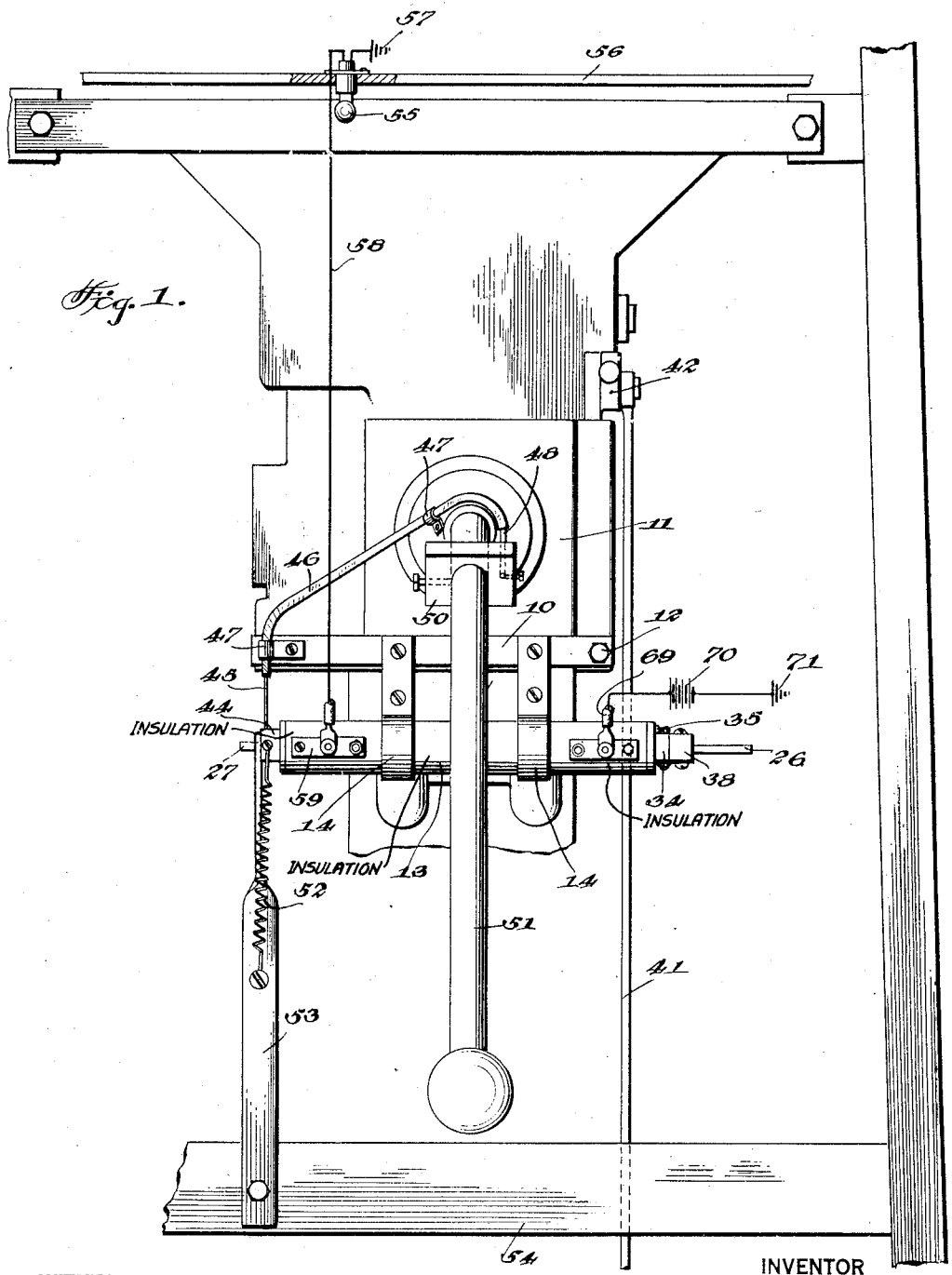

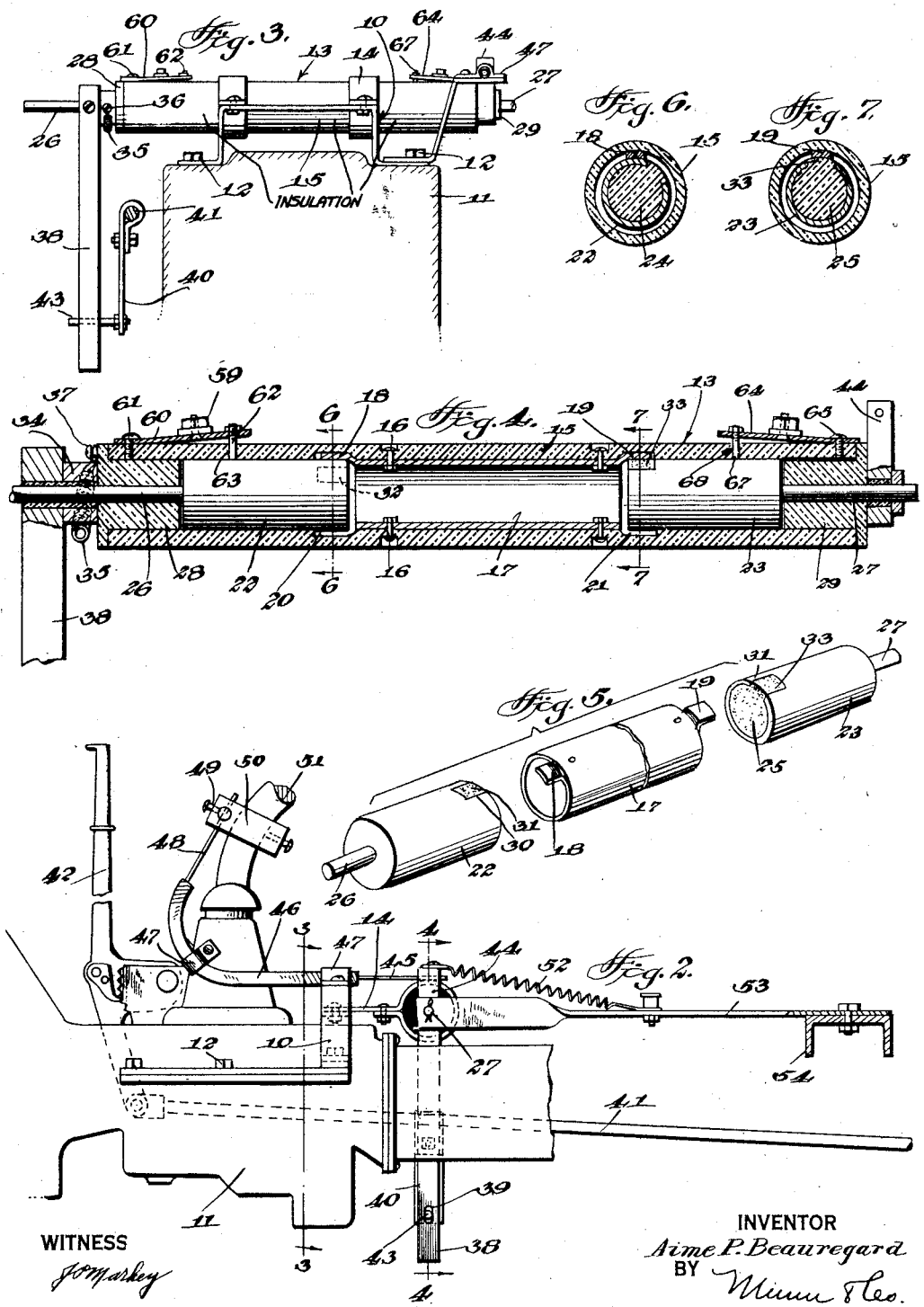

1,913,788

UNITED STATES PATENT OFFICE

AIME P. BEAUREGARD, OF WARE, MASSACHUSETTS

ELECTRIC SIGNAL FOR GEAR SHIFT AND BRAKE LEVERS

Application filed April 2, 1932. Serial No. 602,726.

My invention relates to electric signal mechanism for gear shift and brake levers and it consists in the constructions, arrangements and combinations herein described and claimed.

It is an object of my invention to provide an improved switch mechanism in conjunction with a signal device operable to warn the driver of the vehicle equipped therewith, that the emergency brake lever of the car has not been released.

It is a further object of the invention to provide a switch structure which is operable to establish a circuit to the alarm upon movement of the gear shift lever into either first or reverse speeds and which will be broken upon release of the emergency brake lever.

It is a still further object of the invention to provide a switch of cheap, yet durable construction, and one which may be readily applied to motor vehicles now in general use.

Additional objects, advantages and features of invention will be apparent from the following description and accompanying drawings, wherein:

Figure 1 is a top plan view of a portion of a motor vehicle transmission and brake lever having my switch installed thereon;

Fig. 2 is a side elevation thereof;

Fig. 3 is a cross section on the line 3—3 of Fig. 2;

Fig. 4 is a similar view taken on the line 4—4 of Fig. 2;

Fig. 5 is a detail perspective view illustrating the switch contact elements in detached relation;

Fig. 6 is a cross section of the line 6—6 of Fig. 4;

Fig. 7 is a similar view taken on the line 7—7 of Fig. 4.

In carrying out my invention, I provide a mounting bracket 10 adapted to be secured to the transmission housing 11 by bolts or similar fastenings 12. The bracket 10 supports my switch generally indicated at 13 by brackets 14. The casing 15 of the switch is preferably of cylindrical shape and the brackets 14 are so constructed as to firmly grip the casing against rotary or longitudinal movements.

The casing 15 is formed from any suitable non-conducting material such as bakelite, and has a hollow cylindrical interior, and at the medial portion of the casing there is secured by rivets or fastenings 16 a cylindrical contact member 17. The contact member includes oppositely extended axial fingers 18 and 19, as clearly shown in Figs. 4 and 5. The casing 15 is preferably provided with annular recesses 20—21 to accommodate the fingers 18 and 19 which are slightly offset with respect to the member 17. It should be understood, of course, that the metal constituting the member 17 will be of such resilience as to permit insertion of the member 17 within the casing and that the fingers 18—19 will occupy the recesses 20—21 so as to lie flush with the interior of the casing. If found necessary the member 17 may be split.

Inserted from each end of the casing 15 and oscillatably mounted therewithin are circuit breaker drums 22 and 23, respectively. Each drum 22—23 is of hollow formation and has insulator members 24—25 therein, and further embodies operating shafts 26—27. The shafts 26—27 project a substantial distance from the casing 15 and positioned upon each of the shafts and secured within the casing 15, there are closure plugs 28—29. These plugs 28—29 seal the contact member 17 and drums 22—23 against entrance of foreign matter within the casing.

The drums 22—23 are cut away as at 30—31 and portions 32—33 of the insulator members 24—25 lie flush with the outer surfaces of the drums 22—23 for a purpose presently to be described.

Upon the shaft 26 there is suitably keyed or otherwise secured a collar 34 and extended between the collar 34 and the closure plug 28 there is a helical coil spring 35 anchored to the collar by a set screw 36 and to the plug by a set screw 37. This spring normally holds the drum 22 in contact with the finger 18. The shaft 26 also has secured thereto a downwardly extending lever 38, slotted at its lower end as at 39. A lever 40 is rigidly secured to the brake rod 41 of the hand brake 42, and the lower end of this lever carries a pin 43 engaged within the slot 39.

From the foregoing, it will be apparent that upon movement of the brake lever 42, the drum 22 will be rotated.

The shaft 27 has suitably fixed thereto an upwardly extended lever 44 apertured at its upper end, and one end 45 of a Bowden wire 46 is suitably fixed in this aperture. The Bowden wire may be suitably supported by clips 47 at any suitable points. The opposite end of the wire 48 is fixed as at 49 within a fixture 50 mounted upon the gear shift lever 51.

In order to hold the drum 23 in normal inoperative relation with respect to the contact finger 19, a tension spring 52 is secured to the lever 44 and a brace rod 53, which may be supported by a cross bar 54 of the chassis of the vehicle.

Any suitable form of signal device may be employed, and in the present instance I have illustrated an incandescent lamp 55 mounted upon the dash 56 of the vehicle. One side of the lamp 55 is grounded upon the frame of the vehicle as indicated at 57, while the opposite side of the lamp is connected with a cable 58. The cable 58 is in electrical circuit with a binding post 59 carried by a resilient plate 60. The plate 60 is anchored to the casing 15 as at 61, and the free end of this plate includes a contact pin 62 projected through a suitable aperture 63 so that the pin may bear upon the drum 22.

Associated with the drum 23 there is a resilient plate 64, anchored as at 65, including a binding post 66 and contact pin 67. The pin 67 is projected through an aperture 68 formed in the casing 15 and forms contact with the drum 23. A cable 69 is in electrical circuit with a storage battery 70, one side of which is grounded to the frame of the vehicle, as indicated at 71.

From the foregoing description, the operation of the device will be readily apparent.

With the gear shift lever 51 in neutral position, the portion 33 of the insulator 25 and the contact finger 19 will be aligned and in contact and consequently the circuit of the lamp 55 will not be completed. However, if the gear shift lever 51 is moved to any of the forward or reverse speed positions, such movements will cause a corresponding movement to the Bowden wire 46 which in turn will cause motion to the lever 44 and rotation of the drum 23. Thus the drum 23 will be moved so that the contact finger 19 will bear upon the drum 23. It is, of course, understood that the emergency brake lever is in its braking position, and therefore the finger 18 of the contact member 17 will be in engagement with the drum 22. Thus the circuit to energize the lamp will be as follows: battery 70, cable 69, plate 64, drum 23 by way of contact pin 67, and from the drum 23 to the contact member 17 through finger 19; from the member 17 to the drum 22 by way of the finger 18; from the drum 22 to the plate 60 by way of the pin 62, from the plate 60 to the cable 58 to one side of the lamp 55. The return circuit to the battery is by way of the grounds 57 and 71. The lamp 55 will thus be illuminated, warning the operator that the emergency brake has not been released. With release of the brake 42, it will be obvious that a rocking motion will be transmitted to the lever 38, consequently rotating the drum 22 to bring the portion 32 of the insulator 24 into engagement with the finger 18. As soon as this position of the parts occur, it will be obvious that the circuit to the lamp 55 will be broken and the lamp deenergized.

In addition to functioning as a brake reminder, my device will also serve to notify an operator that his car is in gear, which, of course, is not the proper position of the gears, especially when starting.

While I have shown and described a preferred form of the device, it should be understood that I do not confine myself to the exact construction shown, and reserve as my own all such modifications as fairly fall within the scope of the appended claim.

I claim:

In a switch, a tubular housing, a hollow cylindrical contact member therein, oppositely extended axial fingers carried by said contact member, drum members oscillatably mounted within respective ends of said cylinder and in engagement with respective fingers, each of said drum members having an insulated portion cooperable with each respective finger, a resilient plate member carried by said cylinder adjacent the ends thereof, including a binding post and a contact pin, said contact pin adapted to project through said cylinder into engagement with respective drums, spring means for holding one of said drums in engagement with its associated finger, spring means for holding said other drum to align said insulated portion and its associated finger, and each of said drums having means for effecting independent oscillation thereof.

AIME P. BEAUREGARD.